United States Patent Office 3,778,506
Patented Dec. 11, 1973

3,778,506
USE OF PROSTAGLANDINS TO INDUCE
MEDICAL ABORTION
Kenneth T. Kirton, Kalamazoo, Mich., assignor to The
Upjohn Company, Kalamazoo, Mich.
No Drawing. Filed June 1, 1971, Ser. No. 148,896
Int. Cl. A61k 27/00
U.S. Cl. 424—318
18 Claims

ABSTRACT OF THE DISCLOSURE

Prostaglandins are administered in sterile pharmaceutical dosage forms into the fluid of the amnion of a gestating mammal to induce a medical abortion during the second trimester of the gestation period.

BACKGROUND OF THE INVENTION

Since the early work of Von Euler wherein "Prostaglandin" referred to a fraction of human semen containing lipid-soluble acids, continued research and development have followed in the this area of substances related to prostanoic acid. The latter is represented structurally as

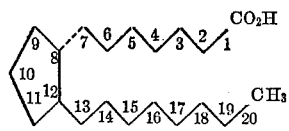

Isolation and purification of naturally occurring prostaglandins have continued as have preparation of derivatives and biological studies. Simplified names and abbreviations have become the art usage to designate the various prostanoic acids. For example, 11α,15(S)-dihydroxy-9-oxo-5-cis,13-trans-prostadienoic acid has become known as prostaglandin $E_2$ or $PGE_2$. 9α,11α,15(S)-trihydroxy-5-cis,13-trans-prostadienoic acid is referred to as prostaglandin $F_{2α}$ or $PGF_{2α}$. Ramwell et al., "Prostaglandins" in Progress in the Chemistry of Fats and Other Lipids, vol. 9, edited by R. Holman, pp. 231–273, Pergamon Press, Oxford, 1968, present a detailed description of preparation and nomenclature. They refer to prostaglandin $PGE_1$ as 11α,15(S)-dihydroxy-9-oxo-13-trans-prostenoic acid, $PGE_2$ as 11α,15(S)-dihydroxy - 9 - oxo - 5 - cis, 13-trans-prostadienoic acid and $PGE_3$ as 11α,15(S)-dihydroxy-9-oxo - 5 - cis,13 - trans,17 - cis-prostatrienoic acid. $PGE_1$ is converted to dihydro-$PGE_1$ by catalytic hydrogenation as described in U.S. Pat. No. 3,069,322. Following the prostanoic acid nomenclature, dihydro-$PGE_1$ is named as 11α,15(S)-dihydroxy - 9 - oxoprostanoic acid. These compounds are characterized by the presence of keto group at the 9-position in the cyclopentane ring. Microbiological conversions of unsaturated fatty acids to PGE-type compounds, including $PGE_1$, $PGE_2$ and $PGE_3$, are described in U.S. Pat. 3,296,091, Rec. Trav. Chim. 85, 1233 (1966), and ibid., 87,461 (1968).

The PGF-type prostaglandins are characterized by the presence of the hydroxyl group at the 9-position in the cyclopentane ring. The designation $PGF_{1α}$ shows the alpha configuration of the hydroxyl at the 9-position. Various other members of the PGF-type are known and are named either systematically or in terms of their relationship to PGF. Illustrative thereof are $PGF_{2α}$, or 7-[3α,5α-dihydroxy - 2 - (3 - hydroxy - 1 - octenyl)-cyclopentyl]-5-heptenoic acid, $PGF_{3α}$ or 7 - [3α,5α-dihydroxy - 2 - (3-hydroxy - 1,5 - octadienyl)-cyclopentyl] - 5 - heptenoic acid, and dihydro-$PGF_{1α}$ or 7 - [3α,5α-dihydroxy-2-(3-hydroxy-octyl)-cyclopentyl]heptanoic acid. Details of preparations from available materials are disclosed for dihydro-$PGF_{1α}$, $PGF_{1α}$, $PGF_{2α}$, and $PGF_{3α}$ in U.S. Pat. No. 3,069,322 and British specification No. 1,040,544. Bergstrom, Carlson and Weeks, Pharmacological Reviews, vol. 20, No. 1, March (1968), review and describe "The Prostaglandins."

Pharmaceutically acceptable salts for example, those of alkali metals and alkaline earth bases, such as the sodium, potassium, calcium and magnesium salts; those of ammonia or a basic amine such as mono-, di-, and triethyl amines, benzylamine, heterocyclic amines such as piperidine and morpholine, and amines containing water-solubilizing or hydrophilic groups such as triethanolamine, tris(hydroxymethyl)aminomethane, and phenylmonoethanolamine are disclosed in U.S. 3,069,322 and British 1,040,544. Carboxylate esters such as methyl, ethyl, butyl, cyclohexyl, octyl, and the like wherein the esterifying radical has 1 to 8 carbon atoms are formed by the usual methods, e.g., reaction with diazomethane or similar diazohydrocarbons as in U.S. 3,069,322 and British 1,040,544.

Biological studies of the prostaglandins, for example, actions on smooth muscle, reproductive system, nervous system, cardiovascular system, and relationship to lipid and carbohydrate metabolism, and miscellaneous effects are summarized by Bergstrom et al.; "The Prostaglandins: A Family of Biologically Active Lipids," Pharmacological Reviews, vol. 20, No. 1, p. 1 et sequitur, March 1968, the Williams and Wilkins Company. Further biological studies include the effect of $PGF_{2α}$ on isolated strips of human pregnant and non-pregnant myometrium in vitro. Bygdeman (1964) Acta. Physiol. Scand. 63, (suppl. 242), 1; Pickles and Hall (1963) J. Reprod. Fert. 6, 315 and Sandberg et al. (1965) Acta. Obstet, Gynec. Scand, 44, 585. Also Karim, S.M.M. (1966) J. Obstet, Gynaec. Brit. Cwlth. 73, 903 and Karim and Devlin (1967) ibid., 230 have shown that $PGF_{2α}$ is present in human amniotic fluid obtained during labor. Wiqvist et al., Am. J. Obstet. Gyn. 102, 327–332 (1968) studied the effect of prostaglandin $E_1$ on the midpregnant human uterus. They observed that intra-amniotic or vaginal administration of $PGE_1$ in high doses had no effect on the uterus. Further, Karim, British Med. J. 4, 618 (1968) has shown that $PGF_{2α}$ appears in the maternal venous blood in variable amounts during labor. It is against this background that the present invention has been conceived and embodied.

BRIEF SUMMARY OF THE INVENTION

Advantageously beneficial induction of abortion is brought about by the administration of certain prostaglandins to mammals during the middle trimester of the gestation period. Female mammals, including humans and animals such as dogs, cats, horses, cattle, and monkeys are administered the prostaglandin active ingredient via the amniotic fluid. The prostaglandin is compounded with pharmacuetical means into a sterile pharmaceutical form which is adapted for administration into the amniotic fluid. Since the abortion is induced in this manner without surgical intervention except for the means used to administer the prostaglandin, it will be referred to hereinafter as medical abortion.

More specifically, this invention comprises a method of inducing a medical abortion in a gestating mammal which consists essentially of introducing into the fluid of the amnion of said mammal during the middle third of the gestation period a sterile pharmaceutical dosage form supplying an effective nontoxic amount for inducing the abortion of a member selected from the group consisting of the free acids, pharmaceutically acceptable salts, and carboxylate esters wherein the esterifying radical has 1 to 8 carbon atoms, inclusive, of a compound represented by the formula

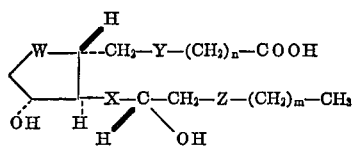

wherein W is

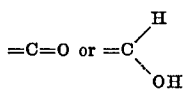

X is $CH_2CH_2$ or trans-$CH=CH$ and both Y and Z are $CH_2CH_2$, or X is trans-$CH=CH$, Y is cis-$CH=CH$ and Z is $CH_2CH_2$ or cis-$CH=CH$; m is 0, 1 or 2 and n is 2, 3, 4 or 5; said member being compounded with pharmaceutical means which adapt the form for administration via the fluid of the amnion.

Compounds of Formula I wherein W is $=C=O$ are of the PGE-type. Compounds of Formula I wherein W is

are of the PGF-type. The compounds of Formula I wherein n is 3 and m is 1 are derivatives of prostanoic acid.

Formula I is to be construed herein as including optically active compounds of the natural configuration and racemic compounds. All of these compounds, including the free acids, salts, and carboxylate esters are known in the art or can be prepared by known methods. See, for example, U.S. Pat. No. 3,296,091; Belgian Pat. Nos. 736,-728 and 747,348; Rec. Trav. Chem. 85, 1233 (1966); ibid. 87, 461 (1968); J. Am. Chem. Soc. 90, 5895 (1968); ibid. 91, 5364 (1969); ibid. 91, 5373 (1969); Chem. Communications, 302 (1969); ibid. 602 (1970). The $PGF_\alpha$-type compounds are also prepared by carbonyl reduction of the corresponding PGE-type compounds, advantageously with sodium borohydride according to known procedures. When an active ingredient is named hereinafter, for example, $PGE_2$ or $PGF_{2\alpha}$, the optically active form with the natural configuration is intended. When reference is made to racemic ingredients, the designation racemic or dl is used.

In carrying out the present invention, the pharmaceutical form is a solution or suspension in an aqueous or oily vehicle. Suitably, the form may be buffered at a physiologically acceptable pH, advantageously a pH in the range 7.2–7.6. Combinations of prostaglandin active ingredients, as described supra, can be made into the pharmaceutical form. The pharmaceutical form supplies an effective nontoxic amount for inducing the abortion, the dose varying with the species of mammal being treated. The effective dosage ranges up to about 5 milligrams per kilogram of body weight of the treated subject. As little as 0.01 milligram per kilogram will suffice in some treated subjects, especially a human female. The sterile pharmaceutical form is administered transabdominally, paracervically or through the cervical canal depending on the exact stage of gestation and the species of subject. One administration will suffice in some cases whereas other cases will require repeated administrations within the overall effective total dosage range. The gestation period varies with the species, the human period being approximately nine months. In a dog the gestation period is approximately 63 days, whereas in a rhesus monkey the time is approximately 165 days. The gestation period in other animals varies as is known in the art. Hence, the middle trimester during which the inventive method is used will total about 21 days in the dog, about 55 days in the rhesus monkey, and about 3 months in the human.

Although the middle trimester is the optimum period for the practice of this aspect of the invention, especially with regard to humans, medical abortion can also be caused at an earlier stage of pregnancy by injection of the prostaglandin into the amniotic fluid. However, until the beginning of the middle trimester, the amniotic sac is usually of such size that injection of the prostaglandin is technically difficult to accomplish.

Pharmaceutical means which adapt the dosage unit form for administration into the amniotic fluid include water, physiological saline aqueous solution, and other dilute aqueous solutions, for example, those containing ethanol, propylene glycol, a polyethylene glycol, or dimethylacetamide. Vegetable oils such as olive oil, peanut oil and similar pharamaceutically acceptable vegetable oils which not preferred are operable means. These means are compounded with the prostaglandin active ingredient by methods known in the art to prepare a sterile form for intra-amniotic administration. In some cases curettage is an advantageous complementary procedure following the medical abortion.

In most mammals including humans, medical abortion is most easily and usefully induced by administration of the prostaglandin into the amniotic fluid during the middle trimester. But in the mammalian genus Bos, medical abortion is also easily and usefully induced by administration of the prostaglandin into the amniotic fluid during a time starting at about day 40 and ending at about day 220 of the gestation period which is normally 275–300 days.

Thus another aspect of this invention comprises a method of inducing a medical abortion in a gestating animal of the genus Bos which consists essentially of introducing into the fluid of the amnion of said animal during a time starting at about day 40 and ending at about day 220 of the gestation period a sterile pharmaceutical dosage form supplying an effective nontoxic amount for inducing the abortion of a member selected from the group consisting of the free acids, pharmaceutically acceptable salts and carboxylate esters wherein the esterifying radical has 1 to 8 carbon atoms inclusive of a compound represented by the formula

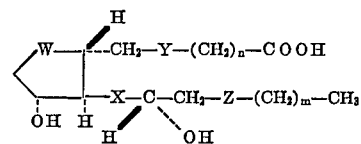

wherein W is

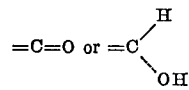

X is $CH_2CH_2$ or trans-$CH=CH$ and both Y and Z are $CH_2CH_2$; X is trans-$CH=CH$, Y is cis-$CH=CH$ and Z is $CH_2CH_2$ or cis-$CH=CH$; m is 0, 1 or 2 and n is 2, 3, 4 or 5; said member being compounded with pharmaceutical means which adapt the form for administration via the fluid of the amnion.

It will be observed that Formula 1a and the definitions of its various parameters are the same as for Formula 1 hereinabove.

The mammalian genus Bos consists largely of the animals known generically as cattle. This method for inducing a medical abortion is especially useful in animals of the group *Bos taurus*, i.e., cattle such as the angus, Hereford, shorthorn, and holstein-friesian, and the group *Bos indicus*, i.e., the humped cattle such as the zebu and brahmin. An especially useful embodiment of this aspect of the invention comprises inducing medical abortion in heifers, i.e., young female cattle which have not previously had a calf and which are destined for feeding and then slaughter as meat animals.

DESCRIPTION OF THE PREFERRED EMBODIMENTS

It is especially advantageous to administer dosage unit forms for ease and economy of administration and uniformity of dosage. Dosage unit form as used in the specification and claims herein refers to physically discrete units suitable as unitary dosages for animal and human subjects, each unit containing a predetermined quantity of active material calculated to produce the desired biological effect in association with the required pharmaceutical means.

Effectiveness of the mode of administration into the amniotic fluid is dependent on providing to the subject female a nontoxic effective amount of the prostaglandin active ingredient for inducing abortion. In harmony with the concept of so administering to the subject such an effective amount of the prostaglandin ingredient various dosage unit forms are operable. Illustratively, the dosage unit forms include an aqueous solution, an aqueous suspension, a solution or suspension in dilute aqueous ethanol or other organic solvent, and a solution or suspension in a vegetable oil such as sesame oil. Whatever type is used it must be sterile.

The amount of the prostaglandin to be administered intra-amniotically varies, as aforesaid, with the age, weight and species to be treated. Up to about 5 milligrams per kilogram is the total effective amount but in some subjects as little as 0.01 milligram per kilogram suffices.

The following examples set forth by way of illustration how to use the inventive method. Hence, they are not intended, and should not be considered, to be by way of limitation.

Example 1

Methods using standard laboratory rhesus monkeys are available to evaluate the present concept and its embodiments, as set forth in the table.

| Monkey No. | Dose of $PGF_{2\alpha}$ mg. | Duration of gestation, days | Results |
|---|---|---|---|
| 45 | 1 | 110 | Aborted. |
| 50 | 1 | 112 | Do. |

General methods utilized in the above:

(1) The prostaglandin is dissolved in absolute ethyl alcohol at a concentration of 100 mg./ml., then diluted in 0.1 M $PO_4$ buffer pH 7.6 to a concentration of 1 mg./ml., to give the final dose in 1.0 ml. of dilute aqueous ethanol solution.
(2) The solution is administered directly into the amniotic fluid (trans-abdominally via a catheter).
(3) Duration of gestation is calculated from the date of mating.
(4) Animals used are mature rhesus monkeys weighing 5 to 7 kilos.
(5) Abortion usually occurs 8 to 12 hours after treatment. In some instances, however, up to 3 or 4 days is required for abortion to occur.

Example 2

An aqueous ethanol (2% ethanol) solution in sterile form is prepared to contain 1 milligram of $PGE_2$ per milliliter. One milliliter is administered intra-amniotically via the cervical canal to a pregnant human female weighing approximately 50 kilograms. The duration of pregnancy is approximately 12 weeks. Successful nontoxic termination of the pregnancy ensues after about 8 hours.

Example 3

An aqueous suspension, in sterile form, is prepared to contain 30 milligrams per milliliter of $PGF_{2\alpha}$. 2 milliliters of this solution is placed into the amniotic fluid using the para-cervical route of a pregnant human female weighing approximately 60 kilos. The duration of pregnancy is approximately 18 weeks. Successful abortion ensues after about one-half day.

Example 4

An aqueous solution in sterile form is prepared to contain 35 milligrams per milliliter of the tris(hydroxymethyl)aminomethane salt of $PGE_2$. 4 milliliters are injected transabdominally into the amniotic fluid of a pregnant human weighing about 70 kilos. The time of pregnancy is approximately 22 weeks. Nontoxic medical abortion is accomplished about 1 day after treatment.

Example 5

An aqueous suspension in sterile form is prepared to contain 25 milligrams per milliliter of the methyl ester of prostaglandin $F_{2\alpha}$. 8 milliliters are placed into the amniotic fluid of a pregnant human female whose time of pregnancy is about 26 weeks. Body weight is about 50 kilos. The cervical canal route of administration is used. Non-toxic medical abortion ensues about 2½ days after treatment.

Example 6

An aqueous sterile solution (25 ml.) containing 400 milligrams of the tris(hydroxymethyl)aminomethane salt of $PGF_{2\alpha}$ is injected trans-abdominally into the amniotic fluid of a 300-kilogram angus heifer. The time of pregnancy is estimated to be about 50 days. Medical abortion occurs after about 15 hours.

Equally beneficial termination of pregnancy during the middle trimester of gestation is accomplished in other humans and in animals such as dogs, cats, monkeys, cattle, and horses utilizing in the intra-amniotic fluid method the other prostaglandin acids, salts and esters depicted in the structural formula supra.

What is claimed is:

1. A method of inducing a medical abortion in a gestating mammal which consists essentially of introducing into the fluid of the amnion of said mammal during the middle third of the gestation period a sterile pharmaceutical dosage form supplying an effective nontoxic amount for inducing the abortion of a member selected from the group consisting of the free acids, pharmaceutically acceptable salts and carboxylate esters wherein the esterifying radical is alkyl of 1 to 8 carbon atoms inclusive of a compound represented by the formula

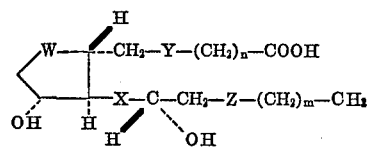

wherein W is =C=O or

X is $CH_2CH_2$ or trans-CH=CH and both Y and Z are $CH_2CH_2$; X is trans-CH=CH, Y is cis-CH=CH and Z is $CH_2CH_2$ or cis-CH=CH; m is 0, 1 or 2 and n is 2, 3, 4 or 5; said member being compounded with pharmaceutical carrier which adapts said form for administration via the fluid of the amnion, said carrier comprising an aqueous or oily vehicle.

2. The method of claim 1 wherein W is =C=O.

3. The method of claim 1 wherein W is

4. The method of claim 1 wherein the gestating mammal is a human female.

5. The method of claim 1 wherein the effective nontoxic amount is up to about 5 milligrams per kilogram of body weight of the mammal.

6. The method of claim 4 wherein the member is $PGE_2$.

7. The method of claim 4 wherein the member is $PGF_{2\alpha}$.

8. The method of claim 4 wherein the member is the tris(hydroxymethyl)aminomethane salt of $PGF_{2\alpha}$.

9. A method of inducing a medical abortion in a gestating mammal which consists essentially of introducing into the fluid of the amnion of said mammal during the middle third of the gestating period of a sterile pharmaceutical dosage form supplying from about 0.01 milligram to about 5 milligram per kilogram of body weight of said mammal of a member selected from the group consisting of the free acids, pharmaceutically acceptable salts and carboxylate esters wherein the esterifying radical is alkyl of 1 to 8 carbon atoms inclusive of a compound represented by the formula

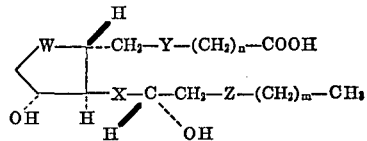

wherein W is

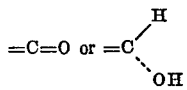

X is $CH_2CH_2$ or trans-CH=CH and both Y and Z are $CH_2CH_2$; X is trans-CH=CH, Y is cis-CH=CH and Z is $CH_2CH_2$ or cis-CH=CH; $m$ is 0, 1 or 2 and $n$ is 2, 3, 4 or 5; said member being compounded with pharmaceutical carrier which adapts said form for administration via the fluid of the amnion, said carrier comprising an aqueous or oily vehicle.

10. The method of claim 9 wherein the gestating mammal is a human female and the member is $PGE_2$ or $PGF_{2\alpha}$.

11. The method of claim 9 wherein the gestating mammal is a human female and the member is the tris(hydroxymethyl)aminomethane salt of $PGF_{2\alpha}$.

12. A method of inducing a medical abortion in a gestating animal of the genus Bos which consists essentially of introducing into the fluid of the amnion of said animal during a time starting at about day 40 and ending at about day 220 of the gestation period a sterile pharmaceutical dosage form supplying an effective nontoxic amount for inducing the absorption of a member selected from the group consisting of the free acids, pharmaceutically acceptable salts and carboxylate esters wherein the esterifying radical is alkyl of 1 to 8 carbon atoms inclusive of a compound represented by the formula

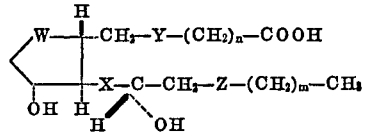

wherein W is

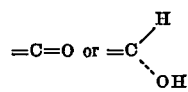

X is $CH_2CH_2$ or trans-CH=CH and both Y and Z are $CH_2CH_2$; X is trans-CH=CH, Y is cis-CH=CH and Z is $CH_2CH_2$ or cis-CH=CH; $m$ is 0, 1 or 2 and n is 2, 3, 4 or 5; said member being compounded with pharmaceutical carrier which adapts said form for administration via the fluid of the amnion, said carrier comprising an aqueous or oily vehicle.

13. The method of claim 12 wherein W is =C=O.

14. The method of claim 12 wherein W is

15. The method of claim 12 wherein the gestating animal is a heifer.

16. The method of claim 15 wherein the member is $PGE_2$.

17. The method of claim 15 wherein the member is $PGF_{2\alpha}$.

18. The method of claim 11 wherein the member is the tris(hydroxymethyl)aminomethane salt of $PGF_{2\alpha}$.

References Cited

Karim: Research in Prostaglandins, vol. 1, No. 3, December 1971.

Wiqvist et al.: Am. J. Obst. & Gynecol, vol. 102 (1968), pp. 327–332.

SAM ROSEN, Primary Examiner

U.S. Cl. X.R.

424—305